United States Patent
Lee

(10) Patent No.: US 6,464,617 B1
(45) Date of Patent: Oct. 15, 2002

(54) SHIFT CONTROL METHOD FOR AUTOMATIC TRANSMISSION

(75) Inventor: Hee-Yong Lee, Suwon (KR)

(73) Assignee: Hyundai Motor Company, Seoul (KR)

( * ) Notice: Subject to any disclaimer, the term of this patent is extended or adjusted under 35 U.S.C. 154(b) by 5 days.

(21) Appl. No.: 09/667,710

(22) Filed: Sep. 22, 2000

(30) Foreign Application Priority Data

Dec. 10, 1999 (KR) .......................................... 99-56538

(51) Int. Cl.[7] .............................................. F16H 61/08
(52) U.S. Cl. ...................................... 477/154; 477/155
(58) Field of Search ............................... 477/116, 117, 477/143, 154, 155, 156

(56) References Cited

U.S. PATENT DOCUMENTS

| | | | | |
|---|---|---|---|---|
| 5,046,178 A | * | 9/1991 | Hibner et al. ............... | 477/117 |
| 5,072,390 A | * | 12/1991 | Lentz et al. ................ | 477/154 |
| 5,211,079 A | * | 5/1993 | Runde et al. ............... | 477/119 |
| 5,520,586 A | * | 5/1996 | Brown et al. ............... | 475/120 |
| 5,542,888 A | * | 8/1996 | Takada et al. .............. | 475/129 |
| 5,792,023 A | * | 8/1998 | Bazzi et al. ................ | 477/115 |
| 5,865,708 A | * | 2/1999 | Nishio et al. ............... | 477/154 |
| 6,149,547 A | * | 11/2000 | Oba et al. ................... | 477/143 |
| 6,325,742 B1 | * | 12/2001 | Lee ............................ | 477/116 |

* cited by examiner

Primary Examiner—Charles A Marmor
Assistant Examiner—Ankur Parekh
(74) Attorney, Agent, or Firm—Birch, Stewart, Kolasch & Birch, LLP

(57) ABSTRACT

In a shift control method for an automatic transmission, it is first determined a signal for shifting from a reverse range to a drive range is input, then further determined if an engine is in an idle state. An initial shifting signal of a first duty ratio is output to a drive unit and maintained the first duty ratio for a first predetermined fill time. Next, the first duty ratio is reduced to a second duty ratio and outputting a signal of the second duty ratio for a soft engagement control to the drive unit, and it is determined if a current turbine rpm is less than a first predetermined value which is obtained by extracting a second predetermined value from a target turbine rpm. Next, a feedback duty control signal is output to the drive unit, and it is determined if a turbine rpm variation is higher than a third predetermined value or if the turbine rpm is less than a fourth predetermined value. Next, the feedback duty control is ended, and after correcting the first duty ratio, an open loop duty control signal is output to the drive unit. After it is determined if the throttle opening is higher than a fifth predetermined value, it is determined if a shifting synchronization is completed. Finally, the throttle opening is corrected and a duty control signal for increasing the duty ratio to a sixth predetermined value is output and the increased duty ratio is maintained for a predetermined duration to the drive unit.

11 Claims, 3 Drawing Sheets

SHIFT CONTROL METHOD FOR AUTOMATIC TRANSMISSION

BACKGROUND OF THE INVENTION (a) Field of the Invention

The present invention relates to an automatic transmission for vehicles, and more particularly, to a shift control method for an automatic transmission that can reduce shift shock when shifting from a reverse R range to a drive D range.

(b) Description of the Related Art

In the automatic transmission used for vehicles, a shift control system performs control to realize automatic shifting into different speeds and shift ranges according to various factors including throttle opening, vehicle speed and load, and several engine and driving conditions detected through a plurality of sensors. That is, based on such factors, the shift control system controls a plurality of solenoid valves of a hydraulic control system such that hydraulic flow in the hydraulic control system is controlled, resulting in the shifting of the transmission into the various speeds and shift ranges.

Particularly, when a driver shifts a selector lever from a reverse R position to a drive D position, shift shock occurs by inertia force of the vehicle and a clutch control problem.

That is, when the shift selector lever is shifted from the reverse R position to the drive D position during a reverse driving state, forward clutches are engaged in a state where the vehicle is moving in a reverse direction, resulting in shift shock.

SUMMARY OF THE INVENTION

Therefore, the present invention has been made in an effort to solve the above problems.

It is an objective of the present invention to provide a shift control method for an automatic transmission that can prevent shift shock when shifting from a reverse R range to a drive D range by slip-controlling forward clutches.

To achieve the objective, the present invention provides a shift control method for an automatic transmission comprising:

determining if a signal for shifting from a reverse range to a drive range is input;

determining if an engine is in an idle state when the signal for shifting from the reverse range to the drive range is input;

outputting an initial shifting signal of a first duty ratio to a drive unit and maintaining the first duty ratio for a first predetermined fill time when the engine is in the idle state;

reducing, when the first predetermined fill time is elapsed, the first duty ratio to a second duty ratio and outputting a signal of the second duty ratio for a soft engagement control to the drive unit;

determining if a current turbine rpm is less than a first predetermined value which is obtained by extracting a second predetermined value from a target turbine rpm;

outputting, when the current turbine rpm is less than the first predetermined value, a feedback duty control signal to the drive unit;

determining if a clutch is in a slip engagement state;

ending, when the clutch is in th slip engagement state, the feedback duty control, and after correcting the first duty ratio, outputting an open loop duty control signal to the drive unit;

determining if an engine is out of an idle state;

determining, when the engine is out of the idle state, if a shifting synchronization is completed;

correcting, when the shifting synchronization is completed, the throttle opening and outputting a duty control signal for increasing the duty ratio to a third predetermined value and maintaining the increased duty ratio for a predetermined duration to the drive unit.

The shift control method may further comprise the steps of outputting a current shifting signal when the engine is not in the idle state, and ending the duty control.

The shift control method may further comprise the steps of determining, when the clutch is not in the slip engagment state, if a vehicle speed is equal to a fourth predetermined value, and outputting, when the vehicle speed is equal to the fourth predetermined value, a duty control signal for increasing a duty ratio to a fifth predetermined value and maintaining the increased duty ratio for a predetermined duration to the drive unit.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

Preferred embodiments of the present invention will now be described in detail with reference to the accompanying drawings.

Figure 1:
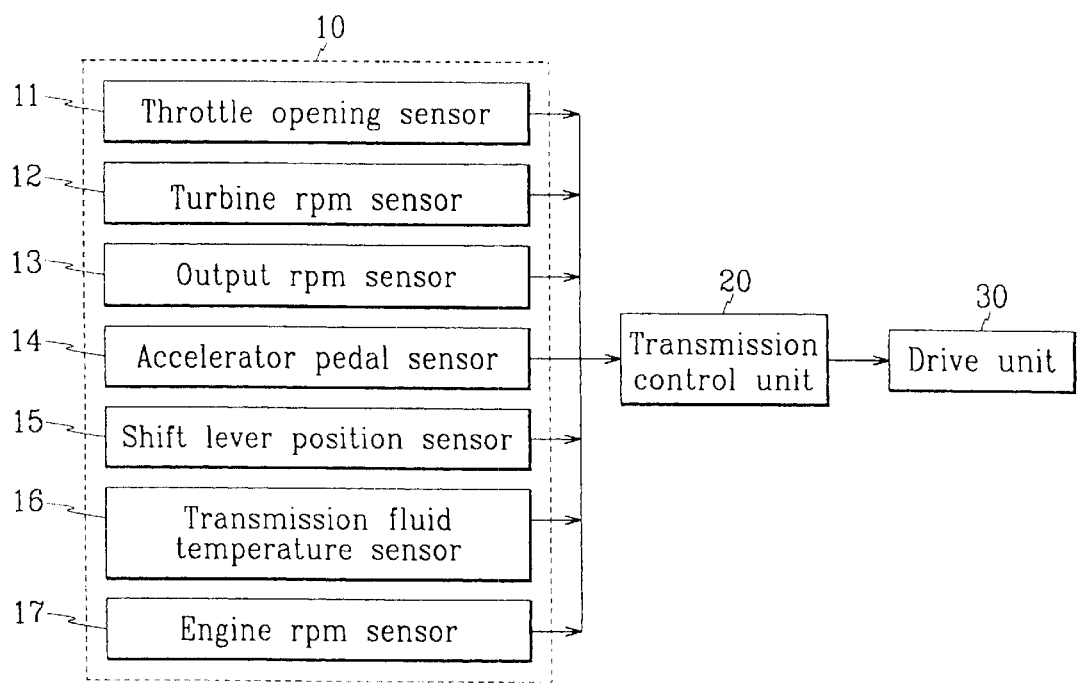
FIG. 1 is a block diagram of a shift control system associated with a shift control method according to a preferred embodiment of the present invention.

FIG. 1 shows a block diagram of a shift control system and related elements to which the present invention is applied.

The shift control system includes a driving condition detector 10, a transmission control unit 20, and a drive unit 30. The driving condition detector 10 detects overall driving conditions of the vehicle. The driving condition detector 10 includes a throttle opening sensor 11, a turbine rpm sensor 12, an output rpm sensor 13, an accelerator pedal sensor 14, a shift lever position sensor 15, a transmission fluid temperature sensor 16, and an engine rpm sensor 17. The elements of the drive state detector 10 output signals to the transmission control unit 20 that controls the operation of the drive unit 30 according to the transmitted signals.

A shift control method according to the present invention will now be described with reference to FIGS. 2 and 3.

Figure 2:
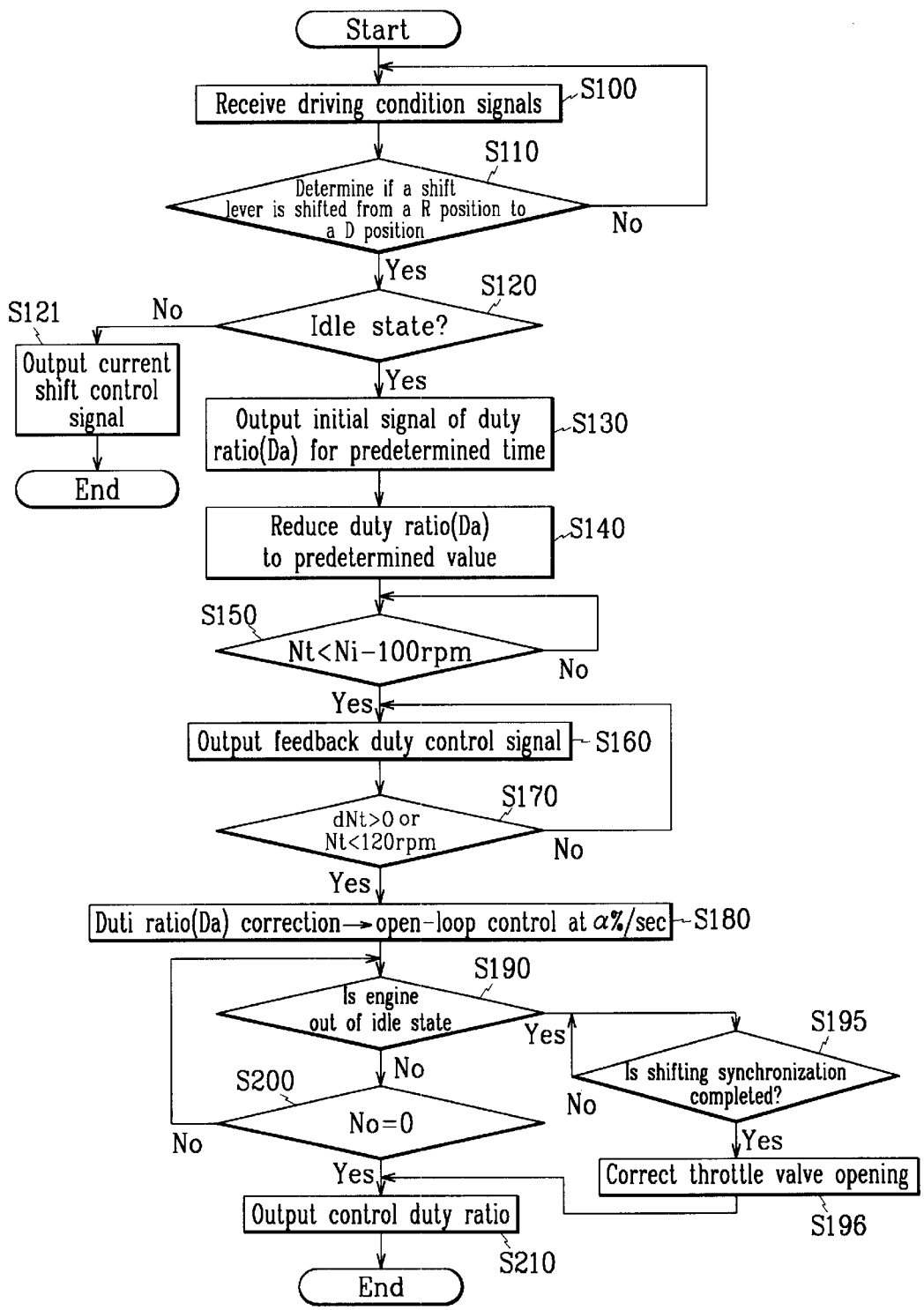
FIG. 2 is a flow chart of a shift control method for an automatic transmission according to a preferred embodiment of the present invention.
Figure 3:
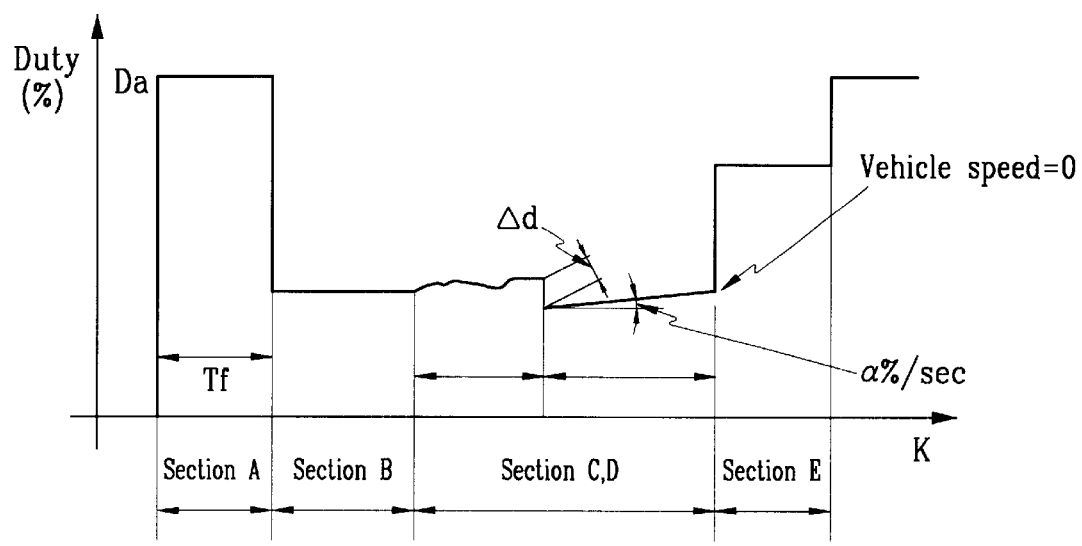
FIG. 3 is a graph illustrating a duty control pattern during a shifting operation from a reverse R range to a drive D range according to a preferred embodiment of the present invention.

FIG. 2 shows a flow chart illustrating a shift control method for an automatic transmission according to a preferred embodiment of the present invention.

First, the transmission control unit 20, which controls the transmission according to a pre-installed program, receives driving condition signals from the driving condition detector 10 (S100). Then, the transmission control unit 20 determines if the vehicle is moving in reverse and whether a shift select lever is shifted from a reverse R position to a drive D position according to the driving condition signals from the driving condition detector 10 (S110). When the vehicle is moving in reverse and the shift select lever is shifted from the reverse R position to the drive D position, the transmission control unit 20 determines if an engine is in an idle state (S120). When the engine is in the idle state, the transmission control unit outputs an initial shifting signal of a first duty ratio Da to the drive unit 30, and the first duty ratio Da is maintained for a predetermined fill time Tf (see section A in FIG. 3) (S130).

The engine idle state is determined according to a throttle valve opening. That is, it is determined that the engine is in the idle state when the throttle valve opening is lower than a preset value.

However, when the engine is not in the idle state, a current shifting signal is output to the drive unit 30 (S121), and the duty control is ended.

The drive unit 30 controls hydraulic pressure to engage the forward clutches and disengage the reverse clutches according to duty control signals output from the transmission control unit 20.

Next, when the predetermined fill time Tf is elapsed, the transmission control unit 20 reduces the first duty ratio Da to a second duty ratio (S140), then outputs a signal of a duty ratio for a soft engagement control (section B in FIG. 3) to the drive unit 30 (S140). Then, the transmission control unit 20 determines if a current turbine rpm Nt is less than a first predetermined value which is obtained by subtracting a second predetermined value (i.e. 100 rpm) from a target turbine rpm Ni (S150).

The second duty ratio is determined according to a duty ratio resulting from a previous soft engagement control procedure.

When the current turbine rpm Nt is less than the first predetermined value, the transmission control unit 20 outputs a feedback duty control signal (section C in FIG. 3) to the drive unit 30 (S160). The drive unit 30 controls the hydraulic pressure to be applied to the forward clutches according to the feedback duty control signal.

After the above, the transmission control unit 20 determines if a turbine rpm variation dNt is higher than a third predetermined value (i.e., 0), or if the turbine rpm Nt is less than a fourth predetermined value (i.e., 120 rpm) (S170), in order to determine if the clutch is in a slip engagement state.

When the clutch is in a slip engagement state (i.e., when the turbine rpm variation dNt is higher than the third predetermined value or the turbine rpm Nt is less than the fourth predetermined value), the transmission control unit 20 ends the output of the feedback duty control, and after correcting a current duty ratio, outputs an open loop duty control signal to the drive unit 30 (S180).

The correcting of the current duty ratio is performed by subtracting a value Δd from a value obtained by adding a duty ratio correction value determined based on a throttle valve opening in a current control procedure to an output duty ratio obtained in a previous control procedure.

During the open loop control section (section D in FIG. 3), the transmission control unit 20 does not determine if a shifting synchronization is completed.

The open loop control signal is output at an upward gradient angle of α%/sec with respect to the corrected duty ratio to control the forward clutches in a slip control state.

The drive unit 30 controls control pressure supplied to the forward clutches according to the open loop control signal from the transmission control unit 20.

Next, the transmission control unit 20 determines if the engine is out of an idle state (S190). That is, by determining if the throttle opening Th is higher than a fifth predetermined value (i.e., 0.75V), the transmission control unit 20 determines if the engine is in an idle state. That is, the transmission control unit 20 determines if the driver operates the accelerator pedal to release the engine idle state.

When the engine is out of the idle state (i.e., when the throttle opening Th is higher than the fifth predetermined value), the transmission control unit 20 determines if the shifting synchronization is completed (S195).

When the shifting synchronization is completed, the throttle opening Th is corrected (S196), after which a duty control signal increased to a duty ratio of a sixth predetermined value is output to the drive unit 30 and the duty control signal of the increased duty ratio is maintained for a predetermined duration (section E in FIG. 3) (S210).

The corrected throttle valve opening is obtained according to the following equation.

$$Thc = A \times Th + B$$

Where

Thc is the corrected throttle opening;

Th is a current throttle valve opening;

A is a seventh predetermined value; and

B is an eighth predetermined value.

When the engine is still in the idle state (i.e., the throttle valve opening is less than the fifth predetermined value) in step S190, the transmission control unit determines if a vehicle speed No is equal to a ninth predetermined value (i.e., 0 Kph). When the vehicle speed No is equal to the ninth predetermined value, the transmission control unit 20 outputs a duty control signal increased to the duty ratio of the sixth predetermined value to the drive unit 30 and maintains the increased duty ratio for the predetermined duration (section E in FIG. 3) (S210).

By maintaining the increased duty ratio for a predetermined duration, after the forward clutches are engaged, the hydraulic pressure supplied to the clutches can be stabilized.

As described above, when the shift lever is shifted from the reverse R position to the drive D position, after the forward clutches are slip-controlled, when the vehicle speed becomes 0 Kph the forward clutches are completely engaged, thereby reducing the shift shock.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A shift control method for an automatic transmission including a clutch comprising:

determining if a signal for shifting from a reverse range to a drive range is input;

determining if an engine is in an idle state when the signal for shifting from the reverse range to the drive range is input;

outputting an initial shifting signal of a first duty ratio to a drive unit and maintaining the first duty ratio for a first predetermined fill time when the engine is in the idle state;

reducing, when the first predetermined fill time is elapsed, the first duty ratio to a second duty ratio and outputting a signal of the second duty ratio for a soft engagement control to the drive unit;

determining if a current turbine rpm is less than a first predetermined value which is obtained by extracting a second predetermined value from a target turbine rpm;

outputting, when the current turbine rpm is less than the first predetermined value, a feedback duty control signal to the drive unit;

determining if a turbine rpm variation is higher than a third predetermined value or if the turbine rpm is less than a fourth predetermined value;

ending, when it is determined that the turbine rpm variation is higher than the third predetermined value or the turbine rpm is less than the fourth predetermined value, the feedback duty control, and after correcting a current duty ratio, outputting an open loop duty control signal to the drive unit;

determining if the engine is out of the idle state;

determining, when the engine is out of the idle state, if a shifting synchronization is completed;

adjusting, when the shifting synchronization is completed, a value of an input throttle opening signal and outputting a duty control signal for increasing the duty ratio to a fifth predetermined value and maintaining the increased duty ratio for a predetermined duration to the drive unit.

2. The shift control method of claim 1 further comprising outputting a predetermined shifting signal when the engine is determined not to be in the idle state.

3. The shift control method of claim 1 further comprising:

determining, when the engine is determined to be still in the idle state in said determining if the engine is out of the idle state, if a vehicle speed is equal to a sixth predetermined value; and outputting, when the vehicle speed is equal to the sixth predetermined value, a duty control signal for increasing a duty ratio to an seventh predetermined value and maintaining the increased duty ratio for a predetermined duration to the drive unit.

4. The shift control method of claim 1 wherein the idle state of the engine is determined according to a throttle opening.

5. The shift control method of claim 1 wherein the second duty ratio is determined according to a duty ratio resulting from a previous soft engagement control procedure.

6. The shift control method of claim 1 wherein the second predetermined value is about 100 rpm.

7. The shift control method of claim 1 wherein the third predetermined value is 0 rpm, and the fourth predetermined value is about 120 rpm.

8. The shift control method of claim 1 wherein the correcting of the current duty ratio is performed by subtracting a value from a value obtained by adding a duty ratio correction value determined based on a throttle valve opening in a current control procedure to an output duty ratio obtained in a previous control procedure.

9. The shift control method of claim 1 wherein the open loop control signal is output at an upward gradient angle of α %/sec with respect to the corrected duty ratio to control the clutch in a slip control state.

10. The shift control method of claim 1 wherein the correcting of the value of the input throttle valve opening signal is performed on the basis of the following equation.

$$Thc = A \times Th + B$$

Where

Thc is the corrected throttle opening;

Th is a current throttle valve opening;

A is a seventh predetermined value; and

B is an eighth predetermined value.

11. The shift control method of claim 3 wherein the sixth predetermined value is about 0 kph.

* * * * *